Patented Sept. 11, 1928.

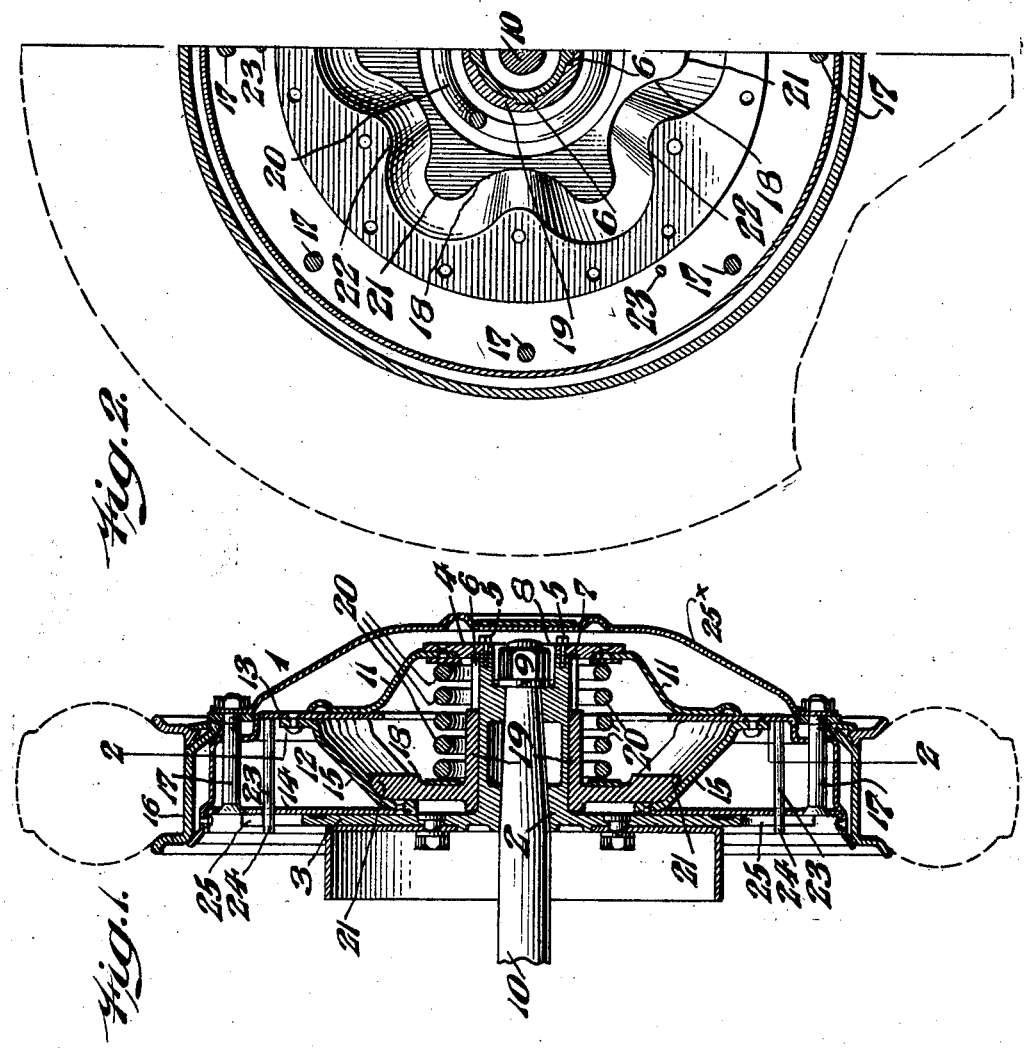

1,684,219

UNITED STATES PATENT OFFICE.

HUGO C. GIBSON, OF PHILADELPHIA, PENNSYLVANIA.

RESILIENT WHEEL.

Application filed January 24, 1927. Serial No. 162,994.

The object of this invention is to simplify the construction of resilient wheels such as form the subject matter of my Patent No. 1,622,867, issued to me on March 29, 1927, to reduce the cost of manufacture by elimination of complication of construction, and to reduce the liability of failure of the parts in use.

In my novel construction, the structure of the tire equipped portion of the wheel or the wheel member comprises four main parts, viz a felloe or tire rim for the outer periphery, a radially corrugated, truncated conical member or bottomless bowl forming the inner periphery and side pieces joining the edges of the felloe and the edges of the bowl to form a strong annular box or wheel body. The tire equipped member or wheel member is mounted upon the hub and is held to the hub against lateral movement in either direction by being assembled between the two flanges of the hub, one of these flanges being removable for the purpose.

The smallest diameter of the bottomless bowl is larger than the diameter of the hub body consequently the wheel member can slide between the hub flanges in any radial direction within the limits of the difference of diameters of the hub body and the bowl.

A radially corrugated, truncated, conical disc having an extended hub internally splined is mounted upon the externally splined body of the main hub so that the disc may slide along the body of the main hub. A spring under partial compression is positioned between one of the flanges of the main hub and the disc for the purpose of forcing the disc toward the other flange of the main hub.

When the various components of the wheel are assembled the centrifugally extending projections of the corrugations of the disc engage between the centrifugally extending projections of the corrugations of the bowl and vice versa and the overall diameter of the circle bounding or defining the maximum limit of the projections of the disc is greater than the diameter of the circle defining the minimum limit of the projections of the bowl. The projections of the disc are thus permanently meshed between the projections of the bowl and no torque effort or other effort applied to the bowl or to the disc can unmesh the one in respect to the other.

The pressure of the spring in forcing the disc laterally along the hub body toward the fixed flange causes the concaved corrugations of the disc to slide over the cone faced corrugations of the bowl and so forces the bowl and its wheel member to a position concentric with the hub and conversely a road shock applied to the wheel member causes a reversal of the operation.

Road shocks cause the wheel member to become eccentric to the hub member by sliding the disc along the hub and compressing the spring which in turn restores the concentric relation after the road obstruction is passed. Torque applied to the hub is transferred to the disc and so to the bowl of the wheel through the interlocking relation of the corrugations of the disc and bowl and thus revolves the wheel.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Figure 1 represents a vertical sectional view of a resilient wheel, embodying my invention, certain of the parts being shown in elevation.

Figure 2 represents a section on line 2—2 Figure 1.

Similar numerals of reference indicate corresponding parts in the figures.

Referring first to Figure 1, 1 designates my novel construction of resilient wheel, the same comprising a hub 2 having a fixed inner flange 3 and a removable outer flange 4 secured to the outer end of said hub by the bolts 5, said flange 4 being further prevented from rotation upon the said hub by engagement of the splines 6 with coacting recesses 7 in said flange 4. The flange 4 has a central aperture 8 permitting access to the axle nut 9 which secures the hub 2 to the axle 10. 11 designates an abutment plate forming an extension to the flange 4. In the present instance, I have shown the parts 4 and 11 as made of two pieces. It is obvious that they may be made integral if desired.

The wheel body 12 is formed of a steel pressing 13, a flanged plate 14 attached to the pressing 13 while the plate 14 and the pressing 13 are attached to the bowl 15, said parts 13, 14 and 15 functioning as a unit.

16 is a demountable rim secured to the wheel body 12 by the bolts 17 or their equivalents. It will be apparent that the wheel body is slidably mounted between the members 3 and 11. 18 designates a radially corrugated truncated conical disc having an extended hub 19 broached to slide upon the splines 6, said disc being held in position against the bowl 15 by the spring 20, said spring 20 being confined between the disc 18 and the flange 4. The outwardly projecting noses 21 of the disc 18 can under the influence of torque applied to the hub 2 or to the wheel member 12 assume a concentric relation to the inwardly projecting noses 22 of the bowl 15 but being larger in diameter they cannot pass the noses 22 of the bowl 15.

As a further precaution against the complete rotation of the wheel member 12 upon the hub 2 I may employ the studs 23 rigidly fixed in the wheel member 12 so that their inwardly projecting ends 24 engage in slots 25 fashioned in the hub flange 3. 25ˣ designates a cover attached to the wheel body 12 by the bolts 17.

The operation is as follows:—

When the various components of the wheel are assembled, the centrifugally extending projections of the corrugations of the disc engage between the centripetally extending projections of the corrugations of the bowl and vice versa and the overall diameter of the circle bounding or defining the maximum limit of the projections of the disc is greater than the diameter of the circle defining the minimum limit of the projections of the bowl.

The projections of the disc are thus permanently meshed between the projection of the bowl and no torque effort or other effort applied to the bowl or to the disc can unmesh the one in respect to the other.

The pressure of the spring in forcing the disc laterally along the hub body toward the fixed flange causes the cone-faced corrugations of the disc to slide over the cone faced corrugations of the bowl and so forces the bowl and its wheel member to a position concentric with the hub and conversely a road shock applied to the wheel member causes a reversal of the operation.

Road shocks cause the wheel member to become excentric to the hub member by sliding the disc along the hub and compressing the spring which in turn restores the concentric relation when the road obstruction is passed. Torque applied to the hub is transferred to the disc and so to the bowl of the wheel through the interlocking relation of the corrugations of the disc and bowl and thus revolves the wheel.

It will now be apparent that I have devised a novel and useful construction of resilient wheel which embodies the features of advantage enumerated as desirable in the statement of the invention and the above description and while I have in the present instance shown and described the preferred embodiment thereof which has been found in practice to give satisfactory and reliable results it is to be understood that the same is susceptible of modification in various particulars without departing from the spirit or scope of the invention or sacrificing any of its advantages.

Having thus described my invention, what I claim as new and desire to secure by Letters Patent, is:—

1. In a road wheel, a hub body having a fixed flange and a removable flange, a hollow wheel having wheel plates of ring form united by a substantially cylindrical band at their outer edges and by a radially corrugated bowl at their inner edges slidably mounted between said flanges, a radially corrugated disc mounted upon the hub body and within the radially corrugated bowl and having splines coacting with the hub body, the corrugations of the disc by coaction with those of the bowl permitting the axis of the hollow wheel with its bowl to become eccentric to the axis of the hub and the wheel to rotate in relation to the hub, such rotation being limited by the construction to less than the width of any one corrugation, and a spring interposed between the radially corrugated disc and the removable hub flange.

2. In a wheel, a hub member with flanges coacting with side plates of a wheel member said wheel member having a radially corrugated truncated conical bowl forming its inner periphery and a substantially cylindrical rim forming its outer periphery said wheel member bowl coacting with a similarly radially corrugated truncated conical disc, said disc slidable only along the axis of the hub body, the maximum diameter of the corrugations of the disc being greater than the minimum diameter of the corrugations of the bowl, and a spring compressed between the disc and one flange of the hub whereby the spring forces the disc toward the other flange of the hub and thereby forces the wheel member axis toward a concentric relation with the hub axis.

3. In a road wheel, a hub member having extended flanges, a wheel member supported laterally by, but free to slide between said flanges and having a truncated, conical, radially corrugated bowl for its inner periphery, a truncated, conical, radially corrugated disc arranged to slide longitudinally upon but not permitted to rotate upon the hub body, the corrugations of said disc engaging the corrugations of said bowl for the purpose of transmitting rotary motion from the hub through the disc to the wheel member while permitting the wheel member to slide from concentric to eccentric relation with the hub member and vice versa, but not permitting the exterior apices of the disc to pass the interior apices of the bowl, and a spring mounted in partially compressed condition between the disc and one flange of the hub member.

4. In a road wheel, a hub body having a fixed flange and a removable flange, attached to said hub body by means of coacting splines and bolts, a hollow wheel having wheel plates of ring form united by a substantially cylindrical band at their outer edges and by a radially corrugated bowl at their inner edges slidably mounted between said flanges, a radially corrugated disc mounted upon the hub body and within the radially corrugated bowl and having splines coacting with the hub body, the corrugations of the disc by coaction with those of the bowl permitting the axis of the hollow wheel with its bowl to become eccentric to the axis of the hub and the wheel to rotate in relation to the hub, such rotation being limited by the construction to less than the width of any one corrugation, and a spring interposed between the radially corrugated disc and the removable hub flange.

HUGO C. GIBSON.